(12) United States Patent
Yahagi et al.

(10) Patent No.: US 6,950,596 B2
(45) Date of Patent: Sep. 27, 2005

(54) VARIABLE OPTICAL ATTENUATOR

(75) Inventors: Akira Yahagi, Shiroishi (JP); Shigeru Kasai, Ichinoseki (JP); Tatsumi Ide, Kashiwa (JP); Michikazu Kondo, Ryuugasaki (JP)

(73) Assignees: NEC Tokin Corporation, Sendai (JP); NEC Tokin Iwate, Ltd., Ichinoseki (JP)

( * ) Notice: Subject to any disclaimer, the term of this patent is extended or adjusted under 35 U.S.C. 154(b) by 124 days.

(21) Appl. No.: 10/716,904

(22) Filed: Nov. 19, 2003

(65) Prior Publication Data

US 2004/0101245 A1 May 27, 2004

(30) Foreign Application Priority Data

Nov. 27, 2002 (JP) ........................................ 2002-343581

(51) Int. Cl.[7] ................................................. G20B 6/26
(52) U.S. Cl. .......................... 385/140; 385/18; 385/33; 385/93
(58) Field of Search ........................ 385/18, 25, 33–36, 385/47, 88–94, 140

(56) References Cited

U.S. PATENT DOCUMENTS

| | | | |
|---|---|---|---|
| 6,137,941 A | * | 10/2000 | Robinson ..................... 385/140 |
| 6,285,504 B1 | | 9/2001 | Diemeer |
| 6,295,154 B1 | | 9/2001 | Laor et al. |
| 6,304,709 B1 | * | 10/2001 | Fujita ........................... 385/140 |
| 6,353,694 B1 | | 3/2002 | Paiam |
| 6,430,332 B1 | | 8/2002 | Laor et al. |
| 6,449,404 B1 | | 9/2002 | Paiam |
| 6,483,962 B1 | | 11/2002 | Novotny |
| 6,535,672 B1 | | 3/2003 | Paiam |
| 6,625,341 B1 | | 9/2003 | Novotny |
| 2002/0018615 A1 | | 2/2002 | Laor et al. |
| 2002/0130561 A1 | | 9/2002 | Temesvary et al. |
| 2003/0164997 A1 | | 9/2003 | Orcutt et al. |

FOREIGN PATENT DOCUMENTS

| | | |
|---|---|---|
| CA | 2307251 A | 10/2000 |
| JP | 4-2934 B2 | 1/1992 |
| JP | 2000-131626 A | 5/2000 |

* cited by examiner

*Primary Examiner*—Phan T. H. Palmer
(74) *Attorney, Agent, or Firm*—Frishauf, Holtz, Goodman & Chick, P.C.

(57) ABSTRACT

A variable optical attenuator comprises an incoming fiber for propagating an incoming light beam, a mirror for reflecting the incoming light beam as a reflected light beam and an outgoing fiber for propagating as an outgoing light beam at least one part of the reflected light beam. The light intensity of the outgoing light beam is determined by the angle of reflection at the mirror. The angle of reflection at the mirror is adjusted by an actuator for rotating the mirror. The actuator comprises a plate, a coil, a housing and permanents magnets. The mirror and the coil are fixed on the plate. The housing supports the plate so that the plate is able to rotate around a rotation axis, which is included on a predetermined plane. The permanent magnets are fixed on the housing and generate predetermined magnetic flux density along the predetermined plane. When a driving current is supplied to the coil under the predetermined magnetic flux density, a Lorentz force occurs at the coil so as to rotate the coil. Together with the coil, the mirror rotates so that the light intensity of the outgoing light beam can be adjusted.

21 Claims, 8 Drawing Sheets

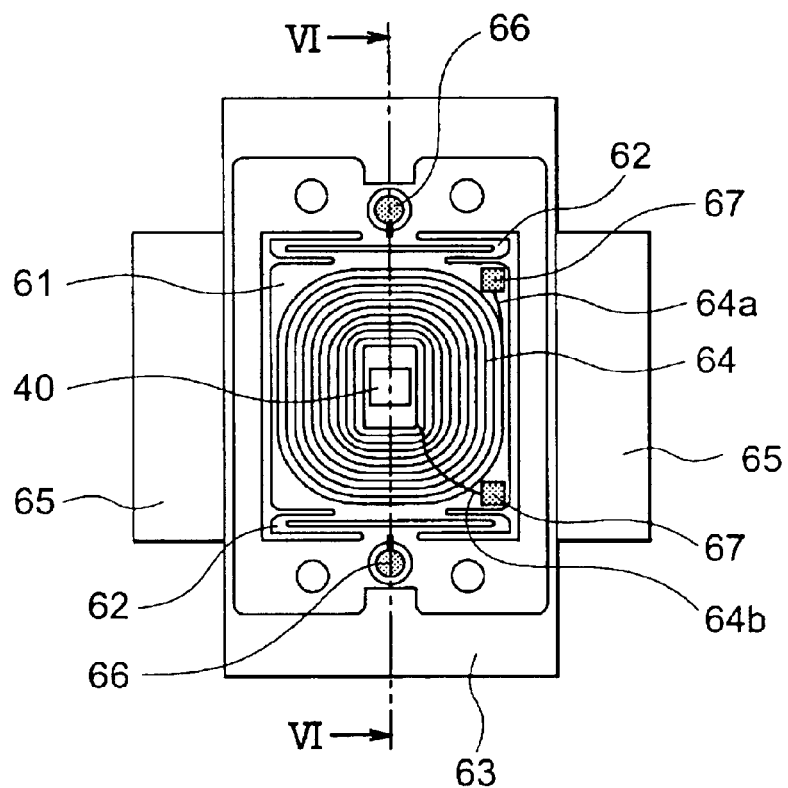
FIG. 5
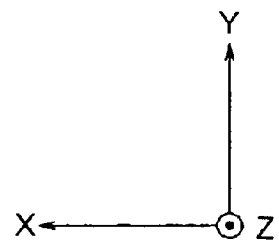

VARIABLE OPTICAL ATTENUATOR

This application claims priority to prior Japanese application JP 2002-343581, the disclosure of which is incorporated herein by reference.

BACKGROUND OF THE INVENTION

This invention relates to an optical device for variable attenuation of the intensity of light input thereto.

Known variable optical attenuator comprises a Faraday rotator placed between two polarizers. For example, the optical attenuator of this type is disclosed in JP-B H04-2934. Normally, garnet crystal is used as the Faraday rotator. However, garnet crystal has a property of large wavelength dependence so that the optical attenuator also has the large wavelength dependence of light intensity attenuation function.

Another variable optical attenuator disclosed in JP-A 2000-131626 solves the above-mentioned wavelength dependence problem. The variable optical attenuator of JP-A 2000-131626 comprises incoming and outgoing fibers, a mirror, and a micromachine on which the mirror is movably disposed. A light beam propagated through the incoming fiber is reflected by the mirror. Then, at least one part of the reflected light beam is propagated into the outgoing fiber. The intensity of the light beam within the outgoing fiber depends on the angle of reflection at the mirror, wherein the angle can be adjusted by the rotation of the mirror by means of the micromachine. The micromachine is a silicon micromachine and works in accordance with an electrostatic principle.

The attenuator of JP-A 2000-131626 has some problems. One problem is that it is difficult to produce them at low cost. Another problem is that the attenuation amount of light intensity cannot be adjusted in linearly response to the change of the driving power supplied to the micromachine because of its electrostatic operation principle. This means that it is difficult to adjust the attenuation amount.

SUMMARY OF THE INVENTION

It is an object of the present invention to provide a variable optical attenuator which has a structure suitable for mass-production and whose attenuation function of light intensity can be adjusted in linearly response to the change of a driving current supplied thereto.

According to this invention, there is provided a variable optical attenuator which comprises an incoming fiber for propagating an incoming light beam, a mirror for reflecting the incoming light beam as a reflected light beam, an outgoing fiber for propagating as an outgoing light beam at least one part of the reflected light beam, and an actuator for rotating the mirror so as to vary light intensity of the outgoing light beam. The actuator comprises, a plate mounting thereon the mirror, a coil disposed on the plate, a driving current being supplied to the coil, a housing supporting the plate so that the plate is able to rotate around a rotation axis, which is included on a predetermined plane; and a permanent magnet which is fixed on the housing and generates predetermined magnetic flux density along the predetermined plane.

According to an aspect of this invention, the plate is rotatably supported to the housing through two spring hinges positioned at opposite ends of the plate in a direction along the rotation axis.

According to an example, the springs hinges are formed integral with a plate of a metal at the opposite ends of the metal plate.

Further objects and other aspects of this invention will be understood from the following description hereinafter.

BRIEF DESCRIPTION OF THE DRAWINGS

FIG. 5 is a view showing a variable optical attenuator according to a second embodiment of the present invention;

DESCRIPTION OF PREFERRED EMBODIMENTS

Figure 1:
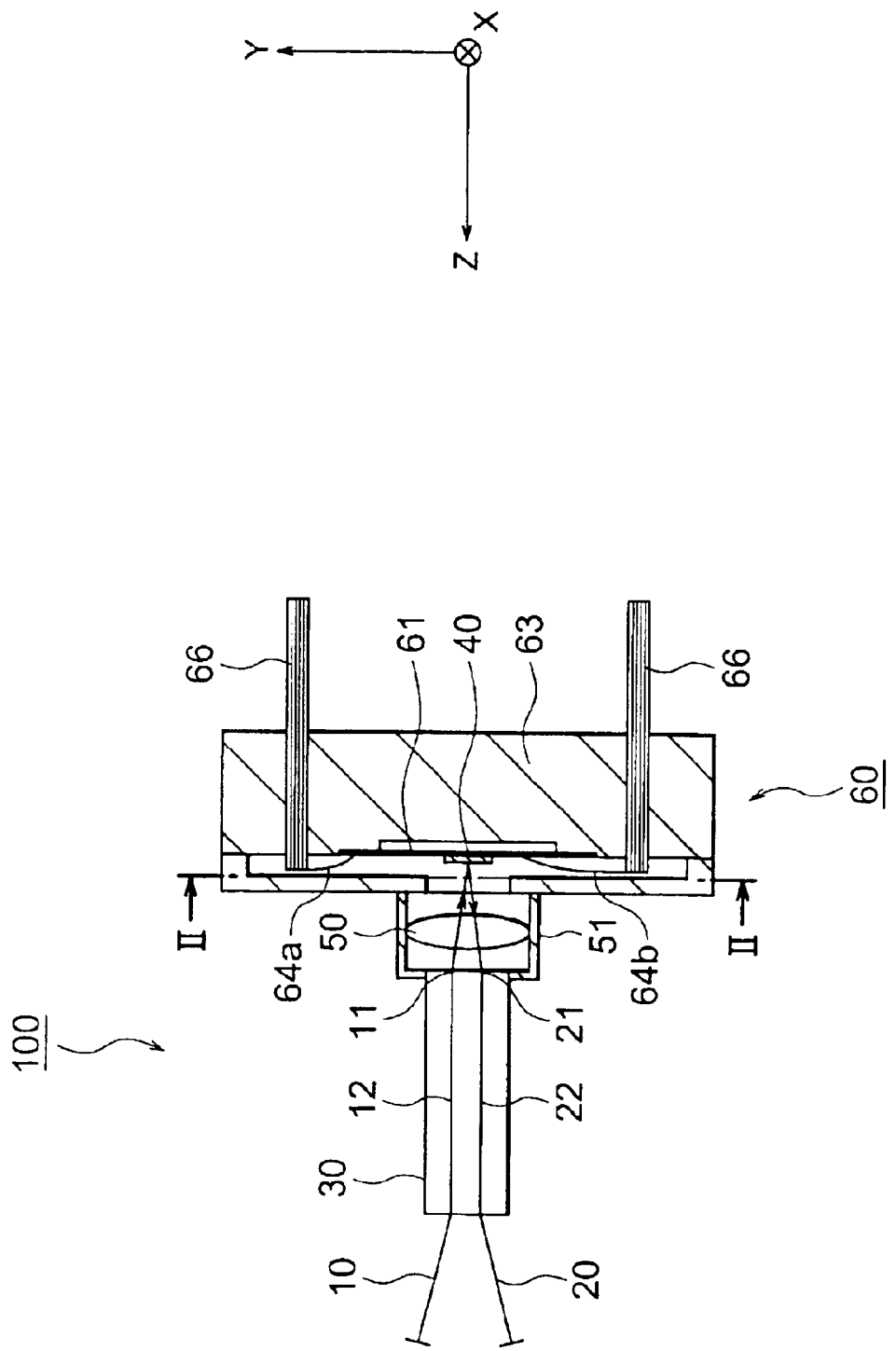
FIG. 1 is a schematic, cross-sectional view showing a variable optical attenuator according to a first embodiment of the present invention.

With reference to FIGS. 1 to 4, a variable optical attenuator 100 according to a first embodiment of the present invention comprises incoming and outgoing fibers 10, 20, a single ferrule 30, a mirror 40, a lens 50 and an actuator 60.

As schematically shown in FIG. 1, the incoming and the outgoing fibers 10, 20 have end portions 11, 21 and the portions 12, 22 near thereto. The end portions 11, 21 and the portions 12, 22 near thereto of the incoming and the outgoing fibers 10, 20 are fixedly arranged in the ferrule 30 so as to be parallel to each other. The mirror 40 is supported by the actuator 60 so that it is able to rotate as described afterwards. The lens 50 is held by a lens holder 51, which is formed as a part of the actuator 60, and is placed between the end portions 11, 21 of the incoming and the outgoing fibers 10, 20 and the mirror 40. As seen from FIG. 1, the ferrule 30 is fixed to the lens holder 51 so that the incoming and the outgoing fibers 10, 20 are fixed to the part of the actuator 60.

The end portions 11, 21 of the incoming and the outgoing fibers 10, 20 face the lens 50. An incoming light beam propagated through the incoming fiber 10 is directed to the mirror 40 through the lens 50. The light beam is reflected by the mirror 40. A part of the reflected light beam is introduced into the outgoing fiber 20 through the lens 50. The light intensity of the light beam within the outgoing fiber 20 is determined by the angle of reflection at the mirror 40. The angle of reflection at the mirror 40 is adjusted by means of the actuator 60, which utilizes a Lorentz force.

The mirror 40 is manufactured by sputtering gold against a surface of a base material which is made of an insulator. The base material of the mirror 40 may be made of a semiconductor material or a conductive material.

Figure 2:
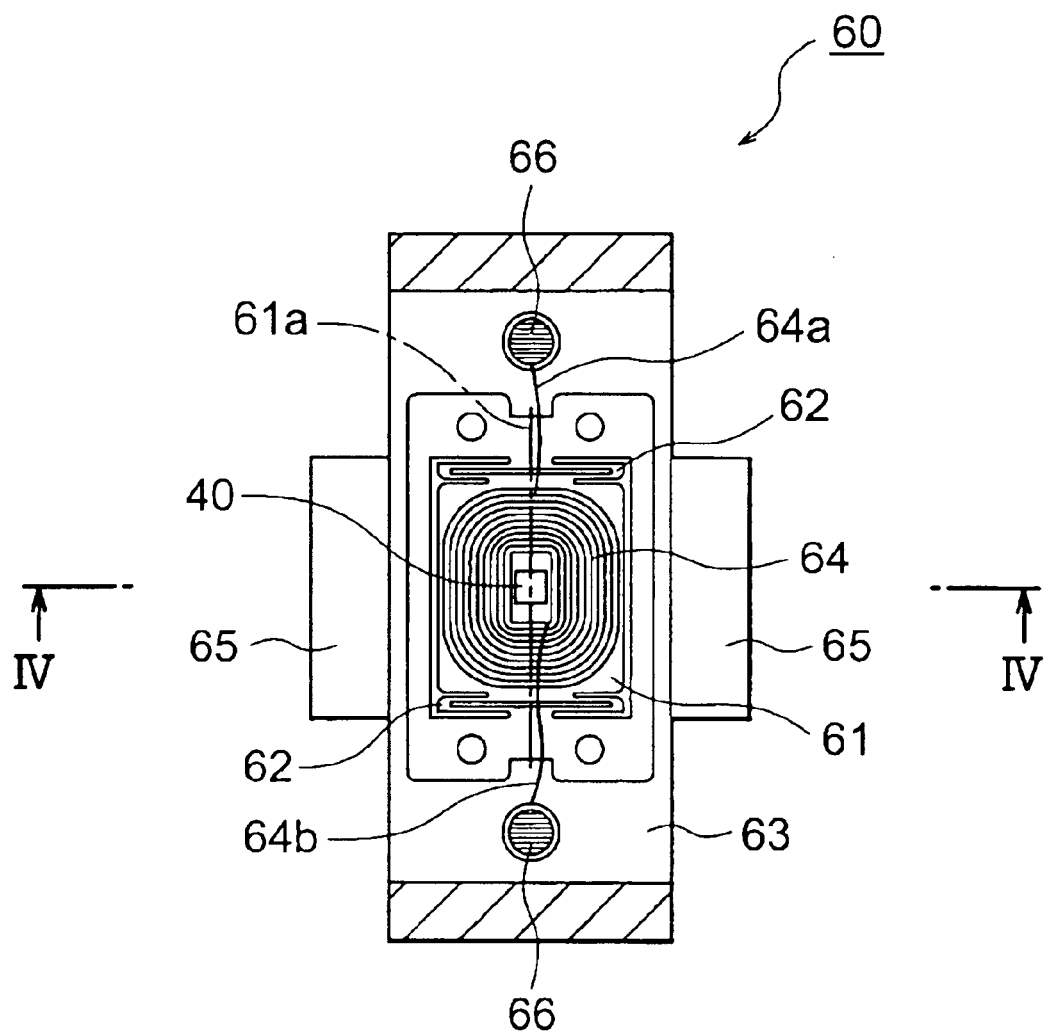
FIG. 2 is another cross-sectional view showing the variable optical attenuator of FIG. 1, taken along lines II—II.
Figure 3:
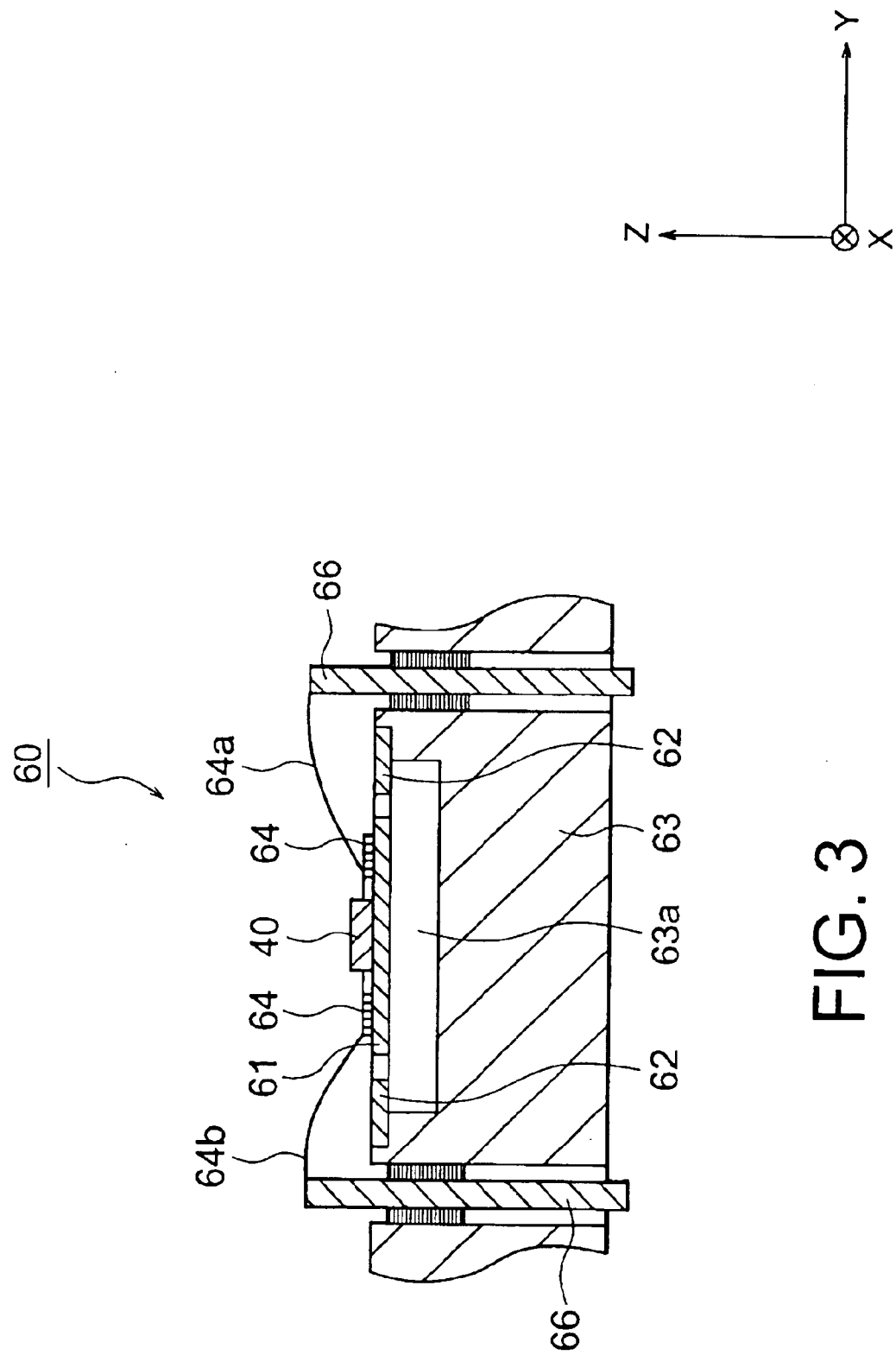
FIG. 3 is a partial, enlarged, cross-sectional view showing the variable optical attenuator of FIG. 1.
Figure 4:
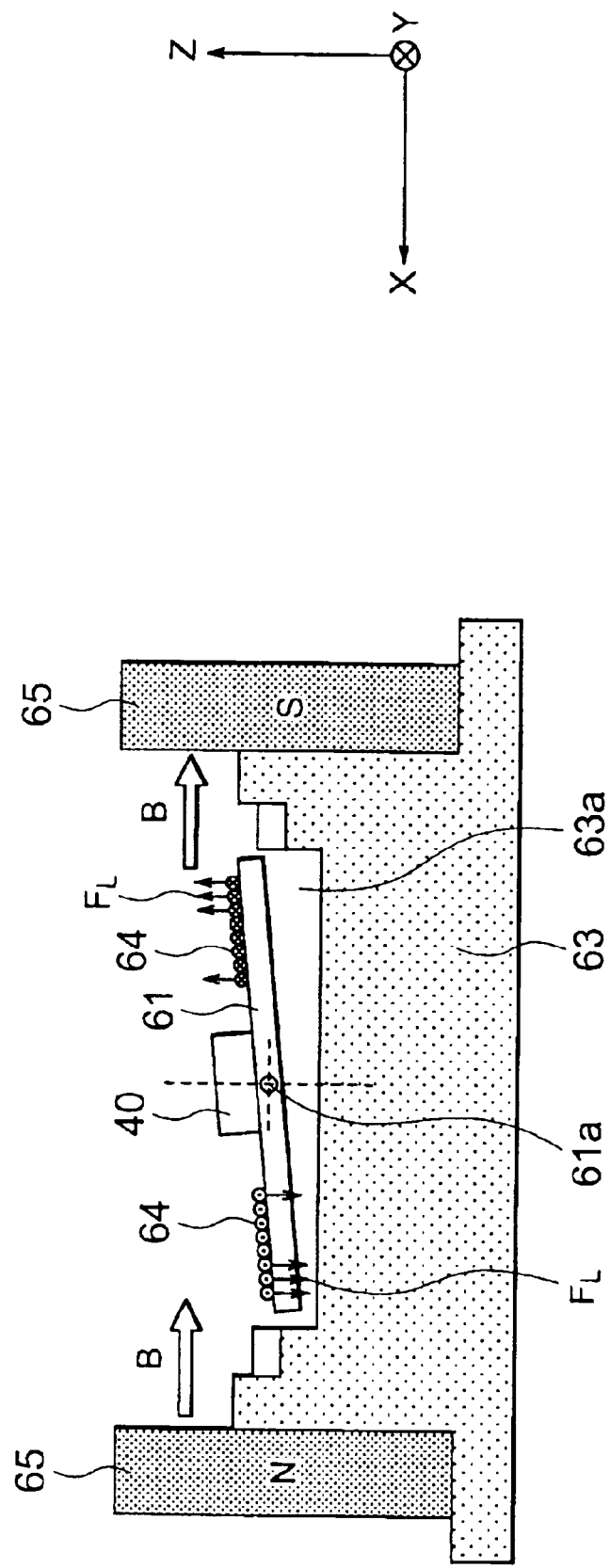
FIG. 4 is another cross-sectional view showing the variable optical attenuator of FIG. 2, taken along lines IV—IV.

With reference also to FIGS. 2 to 4, the actuator 60 comprises a metal plate 61, two hinge springs 62, a housing 63, a coil 64, two permanent magnets 65 and two terminals 66. The metal plate 61 is formed integral with the hinge springs 62, as shown in FIG. 2. The housing 63 serves as a base member, on which the other components of the actuator 60 are arranged. One part of the housing 63 constitutes the lens holder 51 as mentioned above with reference to FIG. 1. The housing 63 is formed with a concave portion 63a, which is shown in FIGS. 3 and 4. The metal plate 61 is suspended from the housing 63 by means of the hinge springs 62 so that the metal plate 61 is able to rotate within the concave portion with no contact with the housing 63, as best shown in FIG. 3. As far as the metal plate 61 can rotate, it can be held or supported by the housing 63 by the use of any other means.

As shown in FIG. 2, the rotation axis 61a of the metal plate 61 extends in a Y-direction. As shown in FIGS. 3 and 4, the mirror 40 is disposed and fixed on a surface of the metal plate 61. As shown in FIG. 2, the position of the mirror 40 is a center of the metal plate 61 in this embodiment so that the mirror 40 is arranged on the rotation axis 61a of the metal plate 61. Under the initial state, the metal plate 61 is generally perpendicular to a Z-direction, which is perpendicular to the Y-direction, so that the mirror 40 is also generally perpendicular to the Z-direction under the initial state. The Z-direction is also a direction along which the incoming light beam is launched on the mirror 40 from the incoming fiber 10.

As best shown in FIG. 2, the hinge springs 62 are positioned at the opposite ends of the metal plate 61 in the Y-direction. Each of the hinge springs 62 has a symmetrical shape with respect to the rotation axis 61a so that a linear movement can be ensured upon the rotation of the metal plate 61.

As shown in FIG. 2, the coil 64 is disposed and fixed on the metal plate 61, especially, on the same surface as the mirror 40 disposed. The coil 64 is an air-core coil, which has a center on the rotation axis 61a of the metal plate 61. The coil 64 surrounds the mirror 40 in a plane parallel to the metal plate 61. The coil 64 is formed by winding a coil line, which has an adhesive layer as its outermost layer so that the coil line has a self-welding function. In addition, the coil line further has an insulation coating layer as its layer inner-next to the outermost layer, so that the neighboring line portions are prevented from being short-circuited electrically when the wound coil 64 is formed. The insulation coating layer provides a desirable insulation function even if its thickness is several μm. In addition, because the line can be wound thickly, the coil 64 can provide a large Lorentz force for its size when a driving current is supplied to the coil 64 as mentioned afterwards. The coil 64 may be wound in the form of one turn or several turns and may be arranged on a surface opposite to the surface where the mirror 40 is arranged. The coil 64 may be formed by using a bobbin or a similar tool which can keep the wound form of the coil 64.

Because the coil 64 and the mirror 40 are fixed on the metal plate 61, the coil 64 and the mirror 40 rotate together with the metal plate 61 when the metal plate 61 rotates, and vice versa. In this embodiment, the coil 64 rotates in accordance with the Lorentz force, and the metal plate 61 and the mirror 40 rotate accordingly. To produce the Lorentz force, the coil 64 is supplied with the driving current. To this end, the terminals 66 are provided for the housing 63, being insulated from each other. The terminals 66 are electrically connected to the respective ends 64a, 64b of the coil 64. In this embodiment, the terminal is arranged in the Y-direction, i.e. a direction along the rotation axis 61a.

As shown in FIGS. 2 and 4, the permanent magnets 65 are fixed to the housing 63. For example, a ferritic permanent magnet or a rare earth permanent magnet can be used as the permanent magnet 65. The permanent magnets 65 are arranged so that the coil 64 is placed between the permanent magnets 65 in an X-direction perpendicular to the Y and the Z-directions. The permanent magnets 65 generate predetermined magnetic flux density B, which has a vector along the X-direction in this embodiment. In other words, the predetermined magnetic flux density B is perpendicular to the rotation axis 61a.

As shown in FIG. 4, when the driving current is supplied for the coil 64 under the circumstance where the predetermined magnetic flux density B caused by the permanent magnets 65 is applied to the coil 64, the coil 64 receives the Lorentz force $F_L$ and thereby are rotated. When the coil 64 rotates, the metal plate 61 and the mirror 40 rotate accordingly, so that the angle of reflection at the mirror 40 can be adjusted. The angle adjustment linearly responds to the change of the driving current. Thus, the variable optical attenuator 100 of the first embodiment can provide an easy operation on the adjustment of the angle of reflection at the mirror 40 and on the adjustment of the light intensity attenuation amount, accordingly.

Next explanation will be directed to a manufacturing process of the actuator 60 with the mirror 40.

The metal plate 61 is formed in a predetermined shape by pressing and etching a flexible metal material, which can provide a spring force. In this embodiment, the metal plate 61 is made of phosphor bronze.

To form the coil 64, the above-mentioned self-welding coil line is wound around a coil winder or an arbor which has a shape of the air-core area of the coil 64. Next, the wound coil line is supplied with warm air so that the self-welding function makes and fixes the form of the coil 64.

The mirror 40 is formed by sputtering gold on the base material. At that time, Ti, Cr, Ta or the like is used as an adhesive seed layer. After the sputtering process, a cutting process is carried out so that the mirror 40 of a predetermined shape can be obtained.

The coil 64 is fixed on the metal plate 61 by the use of an adhesive agent or by welding. Likewise, the mirror 40 is fixed on the metal plate 61 by the use of an adhesive agent or by welding. After that, the hinge springs 62 are connected to the housing 63 by the use of an adhesive agent or by welding so that the metal plate 61 is held by the housing 63. Finally, the permanent magnets 65 are fixed to the housing 63 by the use of an adhesive layer or welding.

Thus, the manufacturing of the actuator 60 with the mirror 40 is made of the respective fabrication processes of the components and the simple assembly process thereof. Therefore, the actuator 60 of the present embodiment can be manufactured easily so that the variable optical attenuator 100 of the present embodiment is suitable for mass-production.

To verify optical properties of the variable optical attenuator according to the first embodiment, some samples were manufactured, and their properties were measured.

Sizes of the sample were as follows.

In the actuator 60, the length of the metal plate 61 is 6–9 mm, the width thereof is 5–7 mm, and the thickness thereof is 0.04–0.1 mm. The length of the hinge spring 62 is 0.8–2.0 mm, and the width thereof is 0.15–0.25 mm. The length of the air-core area of the coil 64 is 1.5–2.5 mm, and the width thereof is 0.5–1.0 mm. The length of the external form of the coil 64 is 4–5 mm, and the width thereof is 3–5 mm. The length of the mirror 40 is 0.7–1 mm, and the width thereof is 0.7–1 mm. The thickness of the base material of the mirror 40 is 0.05–0.3 mm, and the thickness of the gold layer formed on the base material is 0.02–0.05 mm.

The length of each of the permanent magnets is 6–10 mm, the width thereof is 0.5–2 mm, and the thickness thereof is 0.5–2 mm. The total of the diameters of the first and the second optical fibers is 1.0–2.0 mm, and the length thereof is 5–10 mm. The length of the lens is 3.0–4.5 mm, and the outer diameter thereof is 3.0–4.5 mm. The length of the variable optical attenuator 100 is 18–20 mm, the width thereof is 13–17 mm, and the height thereof is 8–12 mm.

The measurements were carried out on the samples' optical properties. When the driving current of the coil 64 was 10 mA, the optical loss was 4.3 dB. When the driving current was 20 mA, the optical loss was 14.0 dB. When driving current was 30 mA, the optical loss was 25.6 dB. When the driving current was 35 mA, the optical loss was 31.9 dB. Thus, the attenuation amount at the variable optical attenuator responded linearly to the change of the driving current supplied for the coil 64.

In addition, it was verified that the actuator 60 could work without any damages until it was used two hundred million more times.

Figure 6:
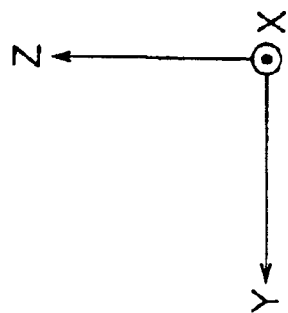
FIG. 6 is a cross-sectional view showing the variable optical attenuator of FIG. 5, taken along lines VI—VI.
Figure 6:
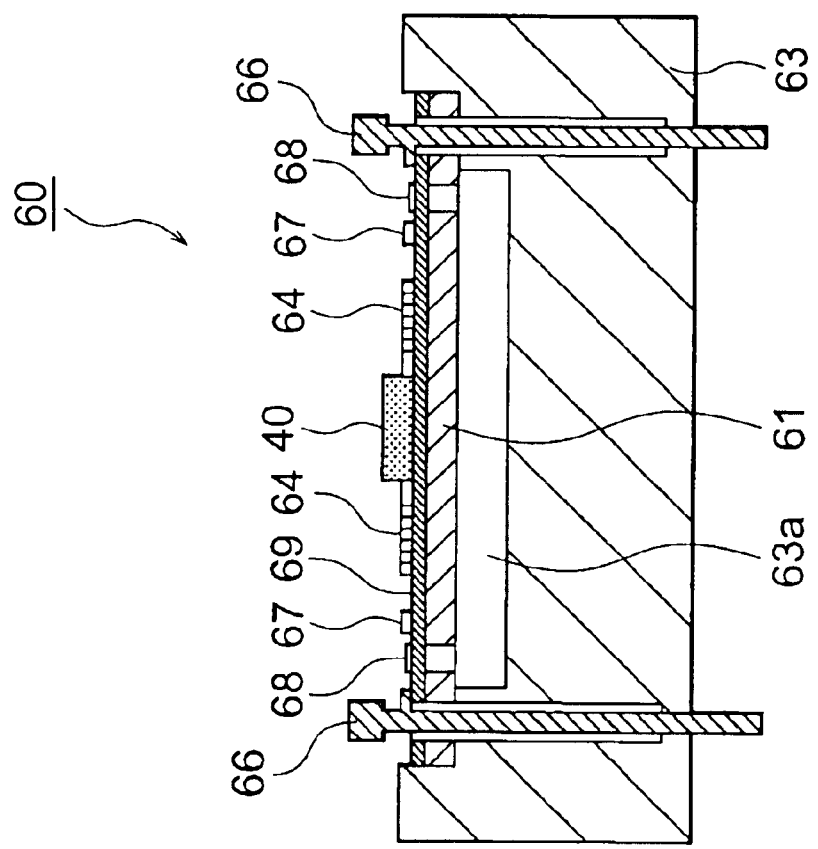

With reference to FIGS. 5 and 6, a variable optical attenuator according to a second embodiment of the present invention is similar to the first embodiment expect for the electrical connections between the ends 64a, 64b of the coil 64 and the terminals 66.

According to the first embodiment, ends 64a, 64b are directly connected to the terminals 66. On the other hand, according to the second embodiment, two intermediate electrodes 67 are provided on the metal plate 5, as shown in FIGS. 5 and 6.

The intermediate electrodes 67 are electrically insulated from each other, while electrically connected to the ends 64a, 64b by soldering or by welding.

The intermediate electrodes 67 are also electrically connected to the terminals 66 by using conductive patterns 68 which are formed on the metal plate 61 via an insulation layer 69. With this structure, the ends 64a, 64b are fixed to and connected to the metal plate 61 so that almost all the mechanical stress, which might occur at the ends 64a, 64b upon the operation of the actuator 60 in the first embodiment, can be solved. Therefore, the connection reliability of the ends 64a, 64b of the coil 64 to the terminals 66 increases.

The actuator 60 according to the second embodiment can be manufactured as described below. The manufacturing method of the actuator 60 is almost the same as the first embodiment, but differs from the first embodiment in that the metal plate 61 is formed by the use of lithography technique and etching process.

For example, the metal plate 61 is made of phosphor bronze. On one surface of the phosphor bronze plate, the insulation layer 69 is formed. For example, the insulation layer 69 is made of photosensitive resin. On the other surface of the phosphor bronze plate, a protection film is formed. The lithography process is carried out on the photosensitive resin so that the external form of the metal plate 61 and the hinge springs 62 is formed. By using a metal mask which has a negative shape of the intermediate electrodes 67 and the conductive patterns 68, conductive materials are sputtered on the insulation layer 69. After that, the metal plate 61 is formed by etching with a predetermined etchant against phosphor bronze. Then, the protection film is removed by the use of a predetermined etchant for the protection film. The metal plate 61 is fitted to the housing 63 while the conductive patterns 68 are electrically connected to the terminals 66.

Figure 7:
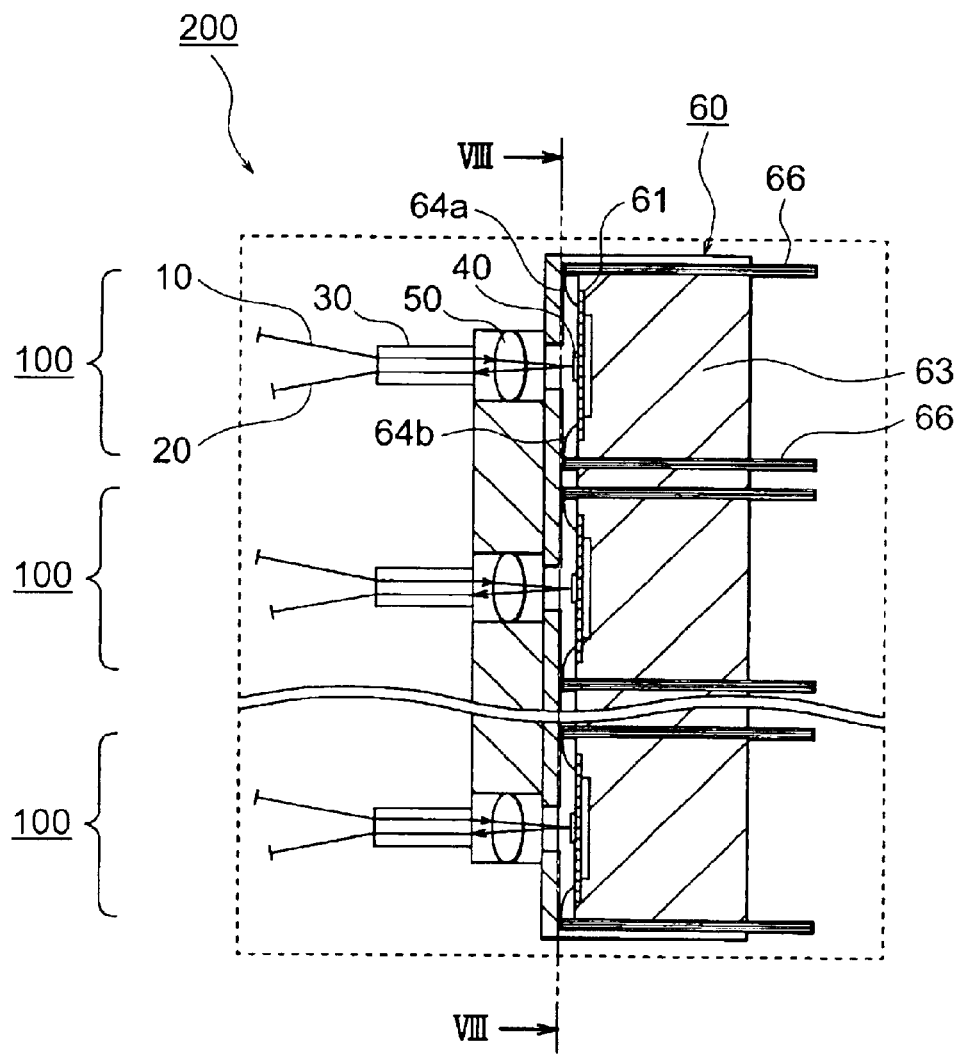
FIG. 7 is a schematic, cross-sectional view showing a variable optical attenuator device according to a third embodiment of the present invention.
Figure 8:
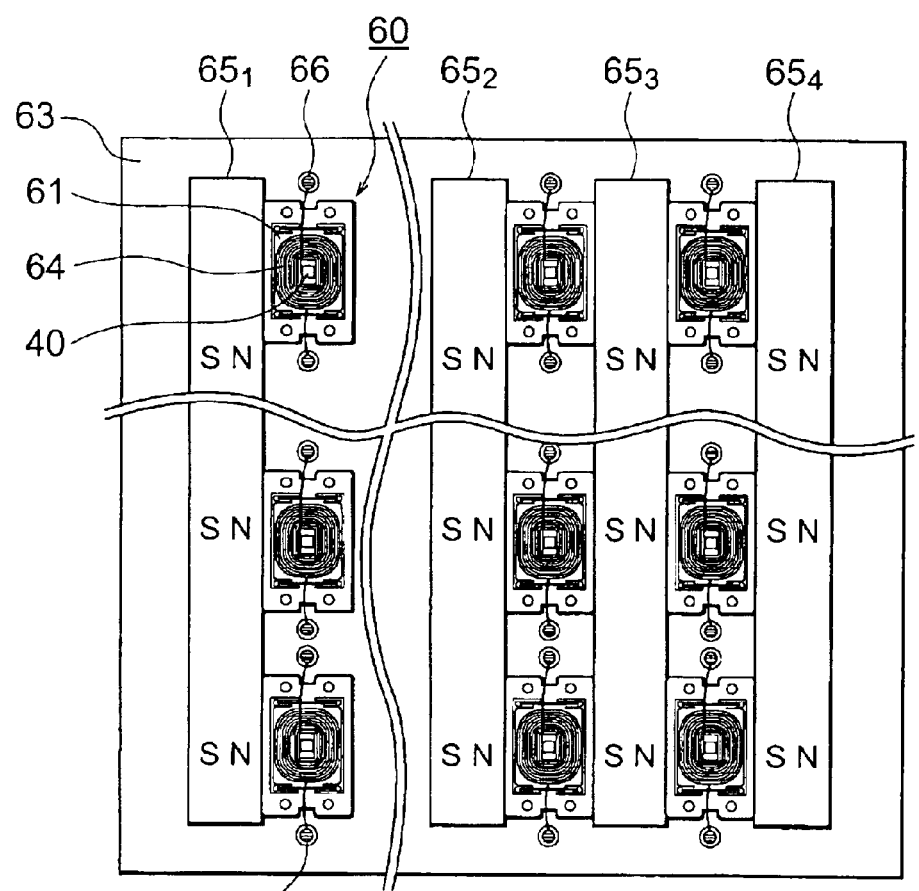
FIG. 8 is a cross-sectional view showing the variable optical attenuator device of FIG. 7, taken along lines VIII—VIII.

With reference to FIGS. 7 and 8, a variable optical attenuator device 200 according to a third embodiment of the present invention is comprised of a plurality of variable optical attenuators 100, each of which is explained in the first or the second embodiment. In other words, a plurality of attenuation functions are integrated into the variable optical attenuator device 200 of the present embodiment.

In more detail, a plurality of metal plates 61 are arranged on a single housing 63. On each of the metal plates 61, the mirror 40 and the coil 64 are arranged as described in the first or the second embodiment.

Each of the permanent magnets $65_1$, $65_2$, $65_3$, $65_4$ is used in common to the variable optical attenuators 100. For example, only one set of permanent magnets 65 may be used. In this case, all of the metal plates 61 each mounting the mirror 40 and the coil 64 are placed between the set of permanent magnets 65.

The above-mentioned embodiments can be modified within the scope of the present invention. For example, TEC (Thermally-diffused Expanded Core) fibers can be used as the incoming and the outgoing fibers 10, 20. In this case, the lens 50 can be omitted.

On the both surfaces of the metal plate 61, two coils 64 may be provided. In the case of two coils 64, a larger Lorentz force can be obtained.

The coil 64 may be disposed on a surface of the metal plate 61, which is opposite to the other surface where the mirror 40 is fixed. This arrangement of the coil 64 and the mirror 40 on different surfaces of the metal plate 61 can provide flexibility on design.

What is claimed is:

1. A variable optical attenuator which comprises an incoming fiber for propagating an incoming light beam, a mirror for reflecting the incoming light beam as a reflected light beam, an outgoing fiber for propagating as an outgoing light beam at least one part of the reflected light beam, and an actuator for rotating the mirror so as to vary light intensity of the outgoing light beam, wherein the actuator comprises:
    a plate mounting thereon the mirror;
    a coil disposed on the plate, a driving current being supplied to the coil;
    a housing supporting the plate so that the plate is able to rotate around a rotation axis, which is included on a predetermined plane; and
    a permanent magnet which is fixed on the housing and generates predetermined magnetic flux density along the predetermined plane.

2. The variable optical attenuator according to claim 1, wherein the plate is rotatably supported to the housing through two spring hinges positioned at opposite ends of the plate in a direction along the rotation axis.

3. The variable optical attenuator according to claim 2, wherein the plate is made of a metal plate.

4. The variable optical attenuator according to claim 3, wherein the springs hinges are formed integral with the metal plate at the opposite ends of the metal plate.

5. The variable optical attenuator according to claim 2, wherein the each of the spring hinges has a symmetrical shape with respect to the rotation axis.

6. The variable optical attenuator according to claim 1, wherein the coil is an air-core coil.

7. The variable optical attenuator according to claim 6, wherein the air-core coil is a winding of a coil material having a self-welding function.

8. The variable optical attenuator according to claim 6, wherein the coil is disposed surrounding the mirror.

9. The variable optical attenuator according to claim 1, wherein the housing is provided with two terminals which are electrically connected to two ends of the coil.

10. The variable optical attenuator according to claim 9, wherein the two terminals are electrically connected to two ends of the coil via two conductive patterns and two intermediate electrodes.

11. The variable optical attenuator according to claim 10, wherein the intermediate electrodes are formed on the plate and are electrically connected to the respective terminals by the respective conductive patterns, while electrically connected to the respective ends of the coil, and a pair of the conductive pattern and the intermediate electrode is electrically insulated from the other pair of the conductive pattern and the intermediate electrode.

12. The variable optical attenuator according to claim 1, further comprising a lens, which is disposed between an end portion of the incoming fiber and the mirror and between an end portion of the outgoing fiber and the mirror.

13. The variable optical attenuator according to claim 1, wherein the incoming and the outgoing fibers are made of TEC (Thermally-diffused Expanded Core) fibers, respectively.

14. The variable optical attenuator according to claim 1, wherein the predetermined magnetic flux density is substantially perpendicular to the rotation axis.

15. The variable optical attenuator according to claim 1, wherein the rotation axis passes through a center of the coil.

16. The variable optical attenuator according to claim 1, wherein, when the driving current is supplied to the coil, the coil rotates in accordance with a Lorentz force caused by the driving current and the predetermined magnetic flux density so that the plate rotates, and thereby, an attenuation amount linearly responds to the driving current supplied to the coil.

17. The variable optical attenuator according to claim 1, wherein the plate has two surfaces, on one of which the mirror and the coil are disposed together.

18. The variable optical attenuator according to claim 1, wherein the plate has two surfaces, on one of which the mirror is disposed, while the coil is disposed on the other surface of the plate.

19. The variable optical attenuator according to claim 1, wherein the coil is comprised of two coil components, and the plate has two surfaces on both of which the respective coil components are disposed.

20. The variable optical attenuator according to claim 1, further comprising a single ferrule, within which end portions and portions near thereto of the incoming and the outgoing fibers are fixed.

21. A variable optical attenuator device comprising a plurality of variable optical attenuators, each of the variable optical attenuators according to one as claimed in claim 1, wherein the plurality of variable optical attenuators are arranged side by side so that each of the attenuator uses in common to at the adjacent one of the variable optical attenuators a single one of the permanent magnet disposed between them.

* * * * *